(12) United States Patent
Naito et al.

(10) Patent No.: US 11,109,002 B2
(45) Date of Patent: Aug. 31, 2021

(54) PROJECTION CONTROL APPARATUS, IMAGE PROJECTION APPARATUS, AND PROJECTION CONTROL METHOD

(71) Applicant: CANON KABUSHIKI KAISHA, Tokyo (JP)

(72) Inventors: Ryosuke Naito, Saitama (JP); Michihisa Yanagi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/789,747

(22) Filed: Feb. 13, 2020

(65) Prior Publication Data

US 2020/0275067 A1 Aug. 27, 2020

(30) Foreign Application Priority Data

Feb. 25, 2019 (JP) .............................. JP2019-031907

(51) Int. Cl.
*H04N 9/31* (2006.01)

(52) U.S. Cl.
CPC ......... *H04N 9/3147* (2013.01); *H04N 9/3105* (2013.01); *H04N 9/3155* (2013.01); *H04N 9/3164* (2013.01)

(58) Field of Classification Search
CPC ......... H04N 9/3147; H04N 9/31–3197; G03B 37/04; G03B 21/00–64
See application file for complete search history.

(56) References Cited

U.S. PATENT DOCUMENTS

| 10,341,626 B2 | 7/2019 | Oike |
| 10,490,159 B2 | 11/2019 | Okamoto |
| 2011/0007172 A1* | 1/2011 | Miceli .................. H04N 9/3194 348/222.1 |

FOREIGN PATENT DOCUMENTS

| JP | 2013247601 A | 12/2013 |
| JP | 2014235295 A | 12/2014 |
| JP | 2016075883 A | 5/2016 |
| JP | 2017083672 A | 5/2017 |

* cited by examiner

*Primary Examiner* — Michelle M Iacoletti
*Assistant Examiner* — Christopher A Lamb, II
(74) *Attorney, Agent, or Firm* — Rossi, Kimms & McDowell LLP

(57) ABSTRACT

A projection control apparatus is configured to control a first image projection apparatus that projects a first image and a second image projection apparatus that projects a second image so that the first image and the second image are superimposed on each other in a predetermined area. The projection control apparatus includes a corrector configured to correct an imaging characteristic for converting a received light amount into captured image data in an imaging apparatus configured to capture the first and second images, by using a pixel value of the predetermined area in the captured image data obtained from the imaging apparatus, and a controller configured to control at least one of the first and second image projection apparatuses using a corrected imaging characteristic.

9 Claims, 8 Drawing Sheets

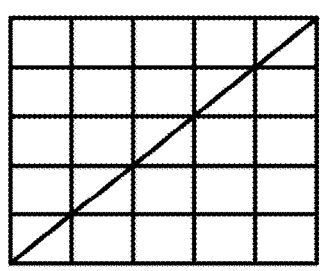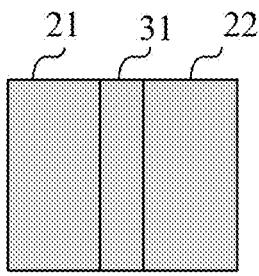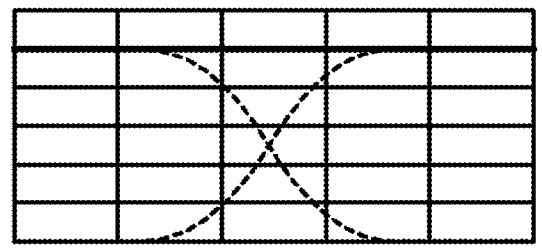
FIG. 1A  FIG. 1B  FIG. 1C
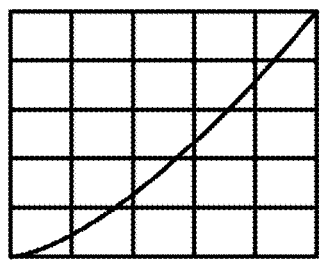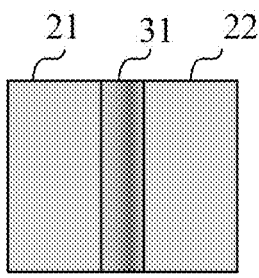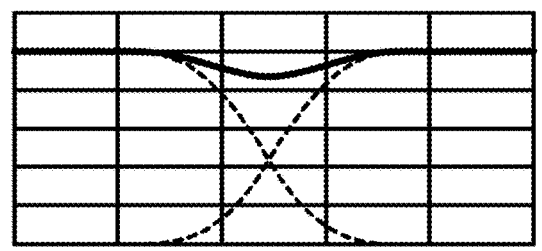
FIG. 2A  FIG. 2B  FIG. 2C
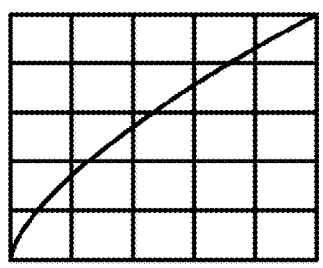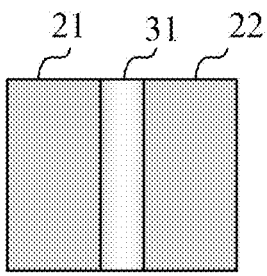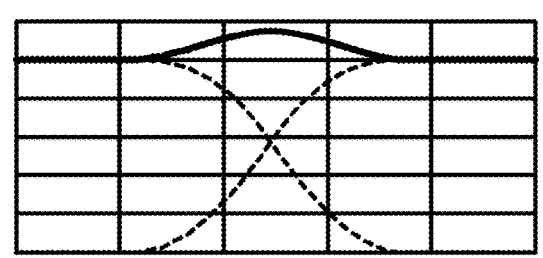
FIG. 3A  FIG. 3B  FIG. 3C

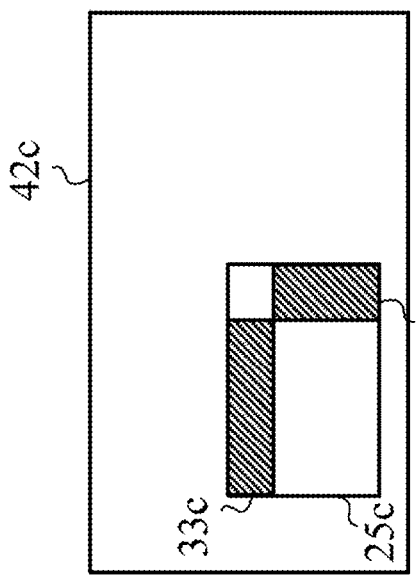
FIG. 10A
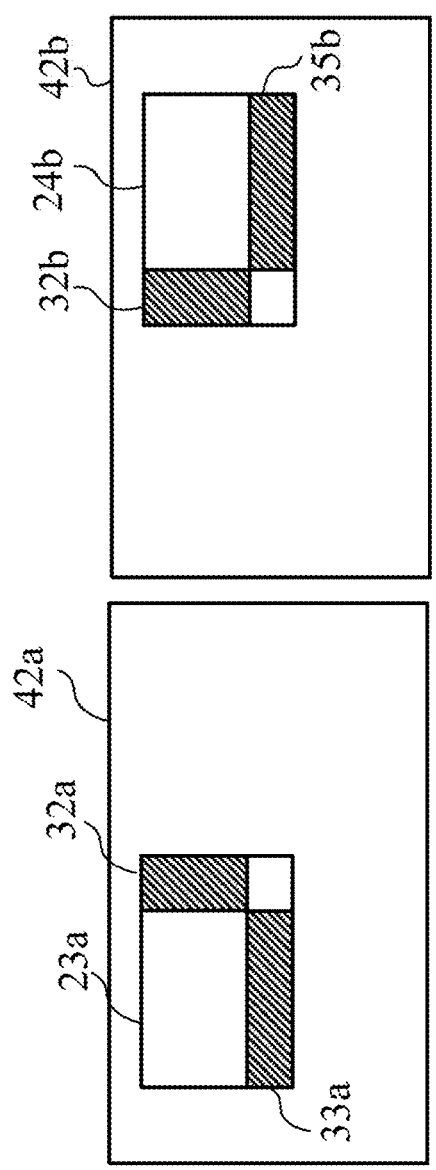
FIG. 10B
FIG. 10C
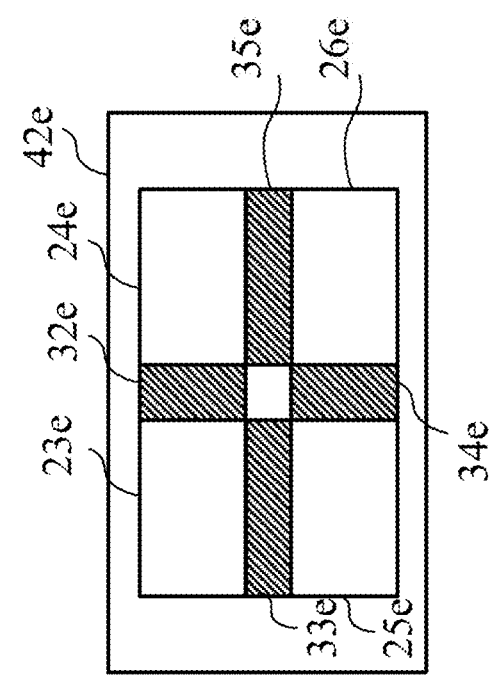
FIG. 10D
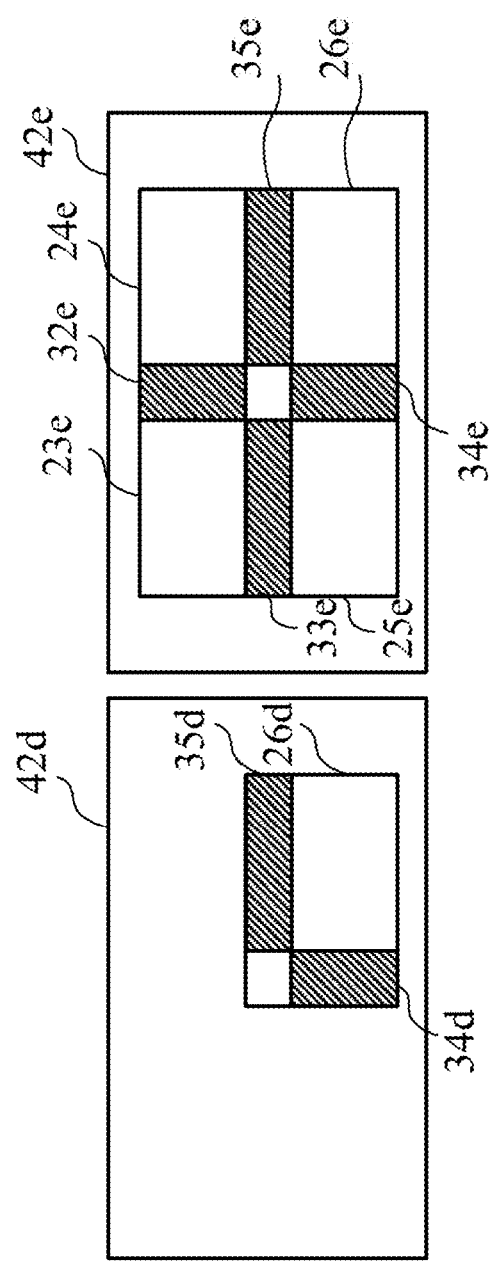
FIG. 10E

PROJECTION CONTROL APPARATUS, IMAGE PROJECTION APPARATUS, AND PROJECTION CONTROL METHOD

BACKGROUND OF THE INVENTION

Field of the Invention

The present invention relates to multi-projection using a plurality of image projection apparatuses (referred to as projectors hereinafter).

Description of the Related Art

In displaying one large image by connecting projection images from a plurality of projectors in the multi-projection, edge blending is performed to superimpose edge areas of the projection images with each other. Then, it is necessary to adjust differences in luminance and color due to the individual differences among the plurality of projectors. However, it is arduous for the user to make all such adjustments.

Accordingly, Japanese Patent Laid-Open No. ("JP") 2017-083672 discloses an image projection system that captures projection images from a plurality of projectors by a camera, and automatically adjusts the plurality of projectors to make equal the colors at a position designated by a user among the captured images. JP 2014-235295 discloses an image projection system that causes a plurality of projectors to project patterns having complementary colors in a superimposed area of a projected image, and automatically adjusts the patterns so that they become achromatic.

However, the image projection system disclosed in JP 2017-083672 is silent about edge blending for smoothly connecting the superimposed areas. The image projection system disclosed in JP 2014-235295 makes an adjustment such that various colors are equal to one another in the overlapping area. However, if the captured image data generated by the camera is not generated with a linear gamma characteristic with respect to the brightness of the incident light and each projector is adjusted without correcting the gamma characteristic, the superimposed area may cause a slight luminance difference.

SUMMARY OF THE INVENTION

The present invention provides a projection control apparatus and the like, each of which can smoothly connect luminances of projected images in multi-projection in their superimposed area.

A projection control apparatus according to one aspect of the present invention is configured to control a first image projection apparatus that projects a first image and a second image projection apparatus that projects a second image so that the first image and the second image are superimposed on each other in a predetermined area. The projection control apparatus includes a corrector configured to correct an imaging characteristic for converting a received light amount into captured image data in an imaging apparatus configured to capture the first and second images, by using a pixel value of the predetermined area in the captured image data obtained from the imaging apparatus, and a controller configured to control at least one of the first and second image projection apparatuses using a corrected imaging characteristic.

An image projection apparatus including the above projection control apparatus also constitutes another aspect of the present invention. A projection control method corresponding to the above projection control apparatus and a non-transitory computer-readable storage medium storing a computer program that causes a computer in an imaging apparatus to execute the above projection control method also constitute another aspect of the present invention.

Further features of the present invention will become apparent from the following description of exemplary embodiments with reference to the attached drawings.

BRIEF DESCRIPTION OF THE DRAWINGS

FIGS. 1A to 1C illustrate a camera having a linear gamma characteristic.

FIGS. 2A to 2C illustrate a camera having a gamma characteristic higher than 1.

FIGS. 3A to 3C illustrate a camera having a gamma characteristic lower than 1.

FIGS. 10A to 10E illustrate captured images according to the second embodiment.

DESCRIPTION OF THE EMBODIMENTS

Referring now to the accompanying drawings, a description will be given of embodiments according to the present invention.

First Embodiment

Figure 4:
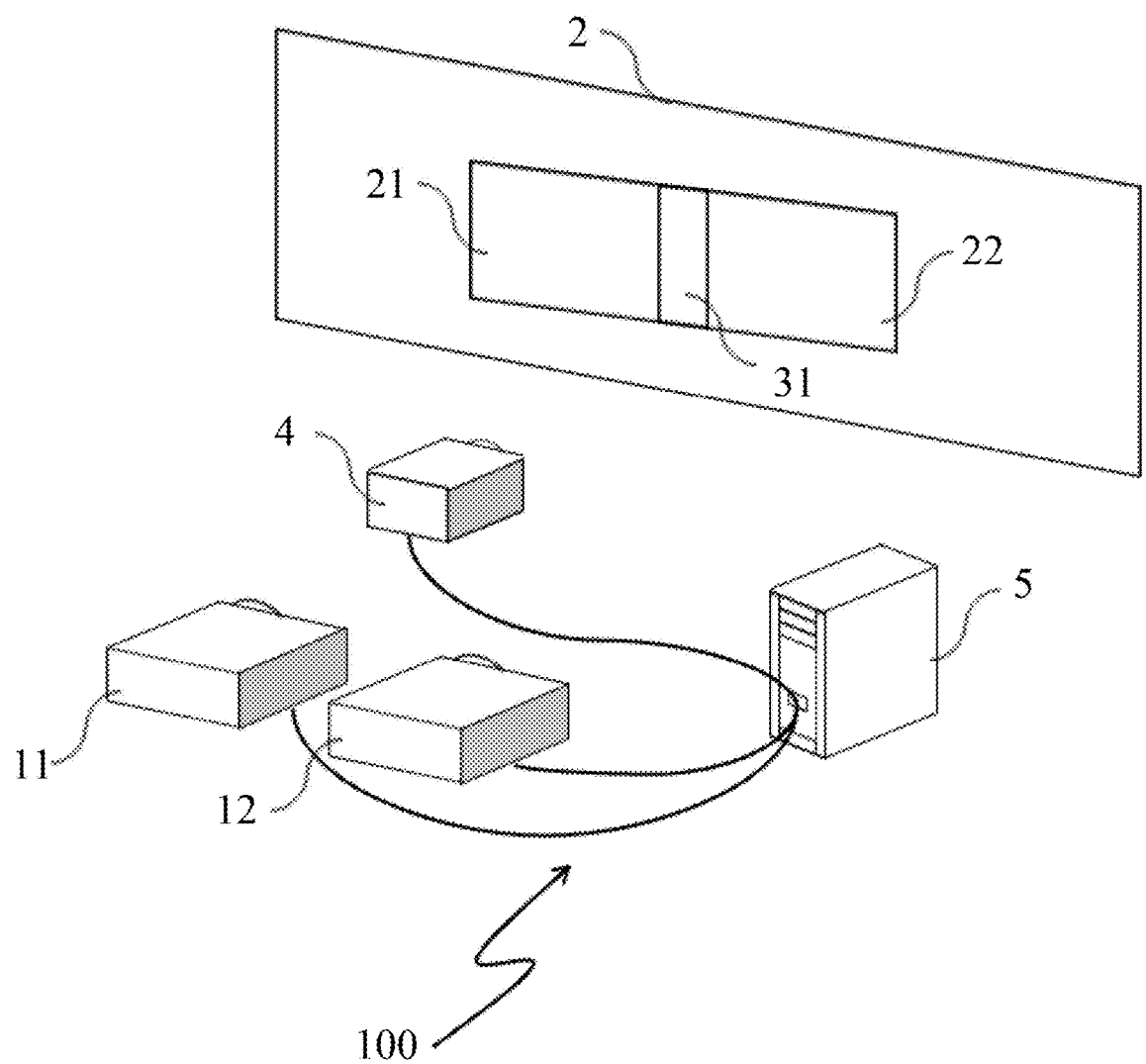
FIG. 4 illustrates an image projection system including a projection control apparatus according to a first embodiment of the present invention.

FIG. 4 illustrates an image projection system 100 including a projection control apparatus according to a first embodiment of the present invention. This system 100 displays one large screen image by connecting a first image 21 projected onto a projection surface 2, such as a screen, by a first projector (first image projection apparatus) 11 and a second image 22 projected onto the projection surface by a second projector (second image projection apparatus) 12. At this time, edge blending is performed so as to superimpose the first and second images 21 and 22 on each other in a superimposed area 31 that is a predetermined area near edges of the first and second images 21 and 22.

The first and second images 21 and 22 are captured by a camera 4 as the imaging apparatus, and a personal computer (PC) 5 as the projection control apparatus (controller or control unit) controls the first and second projectors 11 and 12 using captured image data (simply referred to as "image data" hereinafter) obtained from the camera 4. More specifically, it performs luminance correcting processing for the first and second images 21 and 22 projected by the first and second projectors 11 and 12. The PC 5 serves as a corrector (correction unit) and corrects a gamma characteristic (imaging characteristic), which is a characteristic of the camera 4 converting a received light amount into a pixel value of the captured image, using the captured image.

Referring now to FIGS. 1A to 1C, 2A to 2C, and 3A to 3C, a description will be given of an effect of correcting the gamma characteristic of the camera 4. Among them, FIGS.

1A, 2A, and 2C illustrate gamma characteristics of the camera 4, and FIGS. 1B, 2B, and 3B illustrate a large screen image displayed by the edge-blended first and second images 21 and 22. FIGS. 1C, 2C, and 3C illustrate the luminance at each position in the horizontal direction in the large screen image illustrated in FIGS. 1B, 2B, and 3B by a solid line, and the luminance of each of the first and second images 21 and 22 by a broken line. FIGS. 1A to 1C illustrate the camera 4 having a linear gamma characteristic (with a gamma value of 1.0), FIGS. 2A to 2C illustrate the camera having a gamma characteristic higher than a gamma value of 1.0, and FIGS. 3A to 3C illustrate the camera having a gamma characteristic lower than a gamma value of 1.0.

During edge blending, the correction processing is made such that the luminance of each of the first and second images 21 and 22 changes in a nonlinear curve shape like an S-shaped curve in the respective superimposed area 31 as indicated by a broken line in FIGS. 1C, 2C, and 3C. Where each projector has a gamma characteristic of a gamma value of 2.2 and the camera 4 has a linear gamma characteristic as illustrated in FIG. 1A, each pixel value of an image captured by the camera 4 may be directly used to calculate the pre-correction gamma characteristic of each projector, and the correction processing may be made such that the pixel value of the image projected by each projector can be equal to the gamma value of 2.2. Where the camera 4 has a thus ideal gamma characteristic, the luminances of the first image 21 and the second image 22 are smoothly connected in the superimposed area 31, as illustrated by the solid lines in FIGS. 1B and 1C.

On the other hand, when the camera 4 has a nonlinear gamma characteristic as illustrated in FIGS. 2A and 3A, the superimposed area 31 becomes dark as illustrated by the solid line in FIGS. 2B and 2C or bright as illustrated by the solid line in FIGS. 3B and 3C. This is because the correction processing for adjusting the gamma characteristic of each projector to a predetermined gamma characteristic (such as a gamma value of 2.2) based on the pixel value of the captured image from the camera 4 having a nonlinear gamma characteristic cannot make the gamma characteristic of the image equal to the predetermined gamma characteristic. Hence, when the camera 4 has a nonlinear gamma characteristic as illustrated in FIGS. 2A and 3A, the correction processing according to this embodiment converts this nonlinear gamma characteristic into the linear gamma characteristic as illustrated in FIG. 1A.

Figure 5:
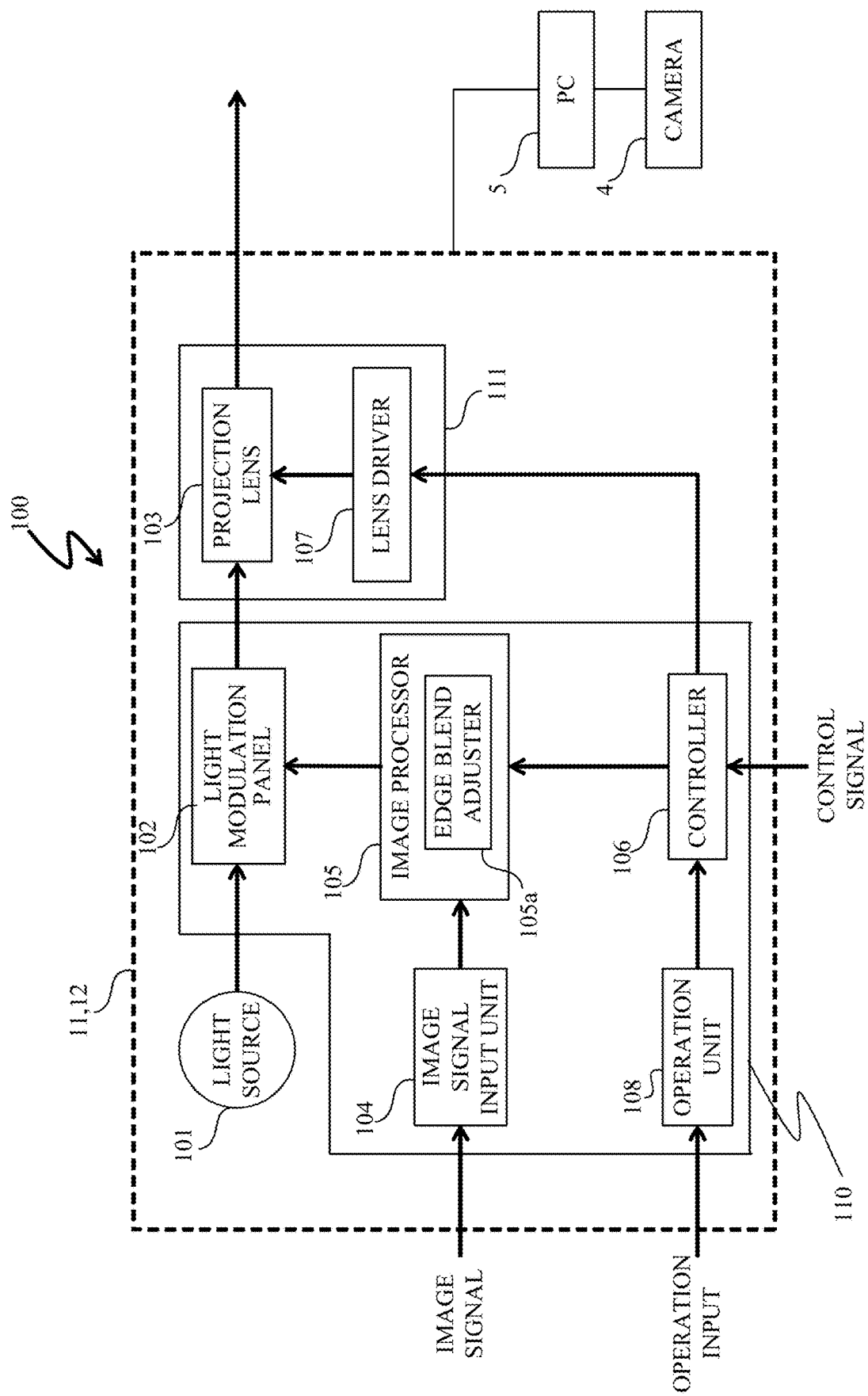
FIG. 5 is a block diagram illustrating a configuration of an image projection system according to the first embodiment.

FIG. 5 illustrates the internal configuration of the first and second projectors 11 and 12. Each projector includes a light source 101, a light modulator 110, and a lens unit 111 including a projection optical system 103. The lens unit 111 further includes a lens driver 107 that drives the projection optical system 103 for zooming, focusing, and shifting.

The light source 101 includes a discharge arc tube, an LED, or a laser, and emits illumination light. The light modulator 110 includes a light modulation panel (light modulation element) 102, an image signal input unit 104, an image processor 105, an operation unit 108, and a controller 106. The image signal input unit 104 has terminals for inputting various image signals such as a VGA signal, a DVI signal, and an HDMI (registered trademark) signal from the outside of the projector, and a receiver IC for receiving an image signal input through these terminals, and the like. The image signal input unit 104 outputs an input image signal to the image processor 105.

The image processor (image processing unit) 105 performs various image processing such as a color unevenness correction, a gamma correction, a contrast correction, a color conversion, an aspect conversion, and a keystone correction for the input image signal, and generates a panel drive signal for driving the light modulation panel 102 based on the image signal that has received image processing. The image processor 105 generates a panel drive signal including an OSD image signal for displaying an OSD (On Screen Display) image, such as a menu for various settings, superimposed on the image signal that has received the image processing.

The light modulation panel 102 includes a liquid crystal panel, a digital micromirror device, or the like, and modulates illumination light from the light source 101 according to a panel drive signal to generate image light. The projection optical system 103 enlarges and projects the image light from the light modulation panel 102 onto the projection surface. Thereby, an image corresponding to the input image signal is projected and displayed.

The image processor 105 includes an edge blend adjuster 105a. During edge blending, the edge blend adjuster 105a provides edge blending processing to the input image signal such that the luminance of the superimposed area superimposed on the projection image of another projector among the projection images on the projection surface gradually becomes darker to the edge as illustrated in FIGS. 1C, 2C, and 3C.

The operation unit 108 includes an operation member operated by a user for making various settings for the projector, an infrared receiver that receives an infrared signal from a remote controller, and the like. The operation unit 108 outputs the operation signal to the controller 106 in response to the operation of the operation member or the infrared reception. The controller 106 includes a microcomputer including a CPU, a memory, and the like, and gives an instruction to the image processor 105 and controls the lens driver 107 according to the operation signal.

As described above, the camera 4 captures images projected on the projection surface 2 by the first and second projectors 11 and 12. The PC 5 is connected to the first and second projectors 11 and 12 and the camera 4 by wire or wirelessly, instructs the camera 4 to capture an image, and instructs the first and second projectors 11 and 12 to project a test chart. The PC 5 makes the correction processing of correcting the gamma characteristic of the camera 4 using the captured image generated by the camera 4 as described above.

In this embodiment, the PC 5, the first and second projectors 11 and 12, and the camera 4 are configured as separate devices. However, the camera may be built in the first or second projector, or the projection control apparatus may be built in the first or second projector.

Figure 6:
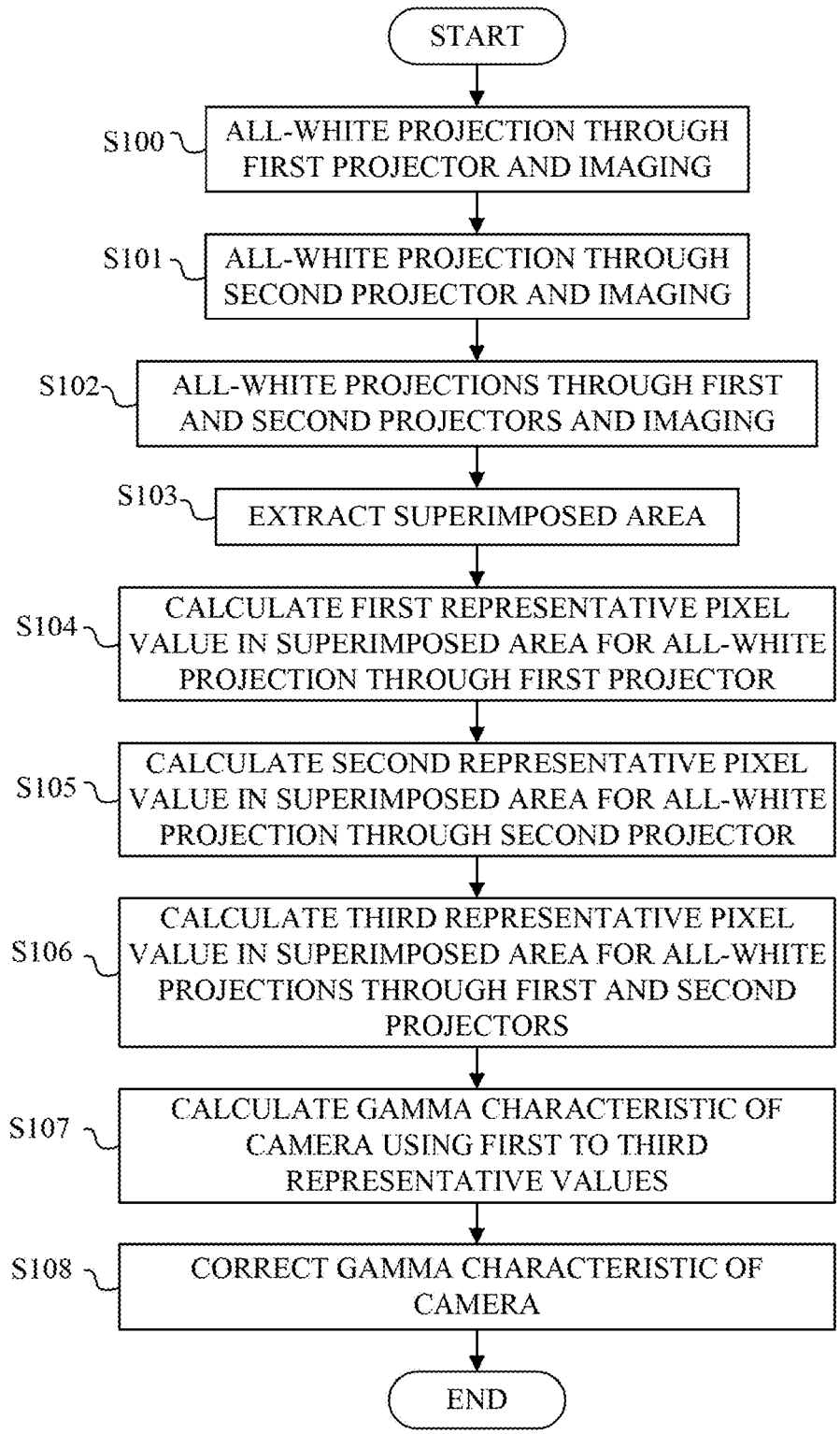
FIG. 6 is a flowchart illustrating gamma correction processing according to the first embodiment.

A flowchart in FIG. 6 shows processing (projection control method) executed by the PC 5. This processing is the correction processing for mainly correcting the gamma characteristic of the camera 4. The PC 5 starts executing the correction processing in accordance with a computer program, for example, when the adjustments of the first and second projectors 11 and 12 are selected using the camera by a menu called by a user operation of the operation unit 108. The PC 5 may start executing the correction processing when the instruction to execute the adjustment is received from the outside or the instruction to execute the adjustment is automatically issued at regular intervals.

In the step S100, the PC 5 causes the first projector 11 alone to project an all-white image (first image) onto the projection surface 2 and the second projector 12 to project an all-black image onto the projection surface 2. The all-white image and the all-black image have superimposed areas that overlap each other. The PC 5 causes the camera 4 to capture these all-white image and all-black image. At this time, instead of causing the second projector 12 to project the all-black image, the second projector 12 may turn off the light source 101 or shut off the illumination light from entering the light modulation panel 102 by an unillustrated shutter.

Next, in the step S101, the PC 5 causes the second projector 12 alone to project an all-white image (second image) onto the projection surface 2 and the first projector 11 to project an all-black image onto the projection surface 2. The all-black image and the all-white image have superimposed area that overlap each other. The PC 5 causes the camera 4 to capture these all-black image and all-white image. Instead of causing the first projector 11 to project an all-black image, the first projector 11 may turn off the light source 101 or shut off the illumination light from entering the light modulation panel 102 by an unillustrated shutter.

Next, in the step S102, the PC 5 causes the first projector 11 and the second projector 12 to simultaneously project the all-white images (first and second images) onto the projection surface 2 so that they have a superimposed area. Then, the PC 5 causes the camera 4 to capture these all-white images.

Next, in the step S103, the PC 5 extracts a superimposed area from the three captured images obtained in the steps S100 to S102, and acquires a pixel value of the superimposed area.

Figure 7:
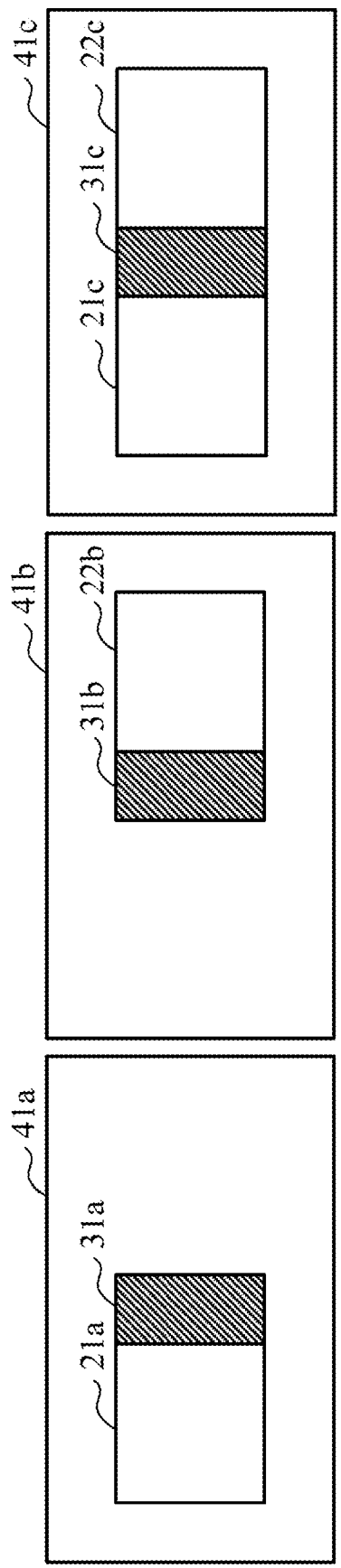
FIGS. 7A to 7C illustrate captured images according to the first embodiment.

FIG. 7A illustrates a captured image (first captured image data) 41a captured by the camera 4 when the all-white image is projected onto the projection area 21a on projection surface 2 by the first projector 11 in the step S100. FIG. 7B is a captured image (second captured image data) 41b captured by the camera 4 when the all-white image is projected on the projection area 22b on the projection surface 2 by the second projector 12 in the step S101. FIG. 7C illustrates a captured image (third captured image data) 41c obtained by capturing all white images projected on projection areas 21c and 22b by first and second projectors 11 and 12 in the step S102, respectively. In these figures, the superimposed areas 31a, 31b, and 31c are shaded.

The PC5 detects each projection area as an area surrounded by straight lines made by connecting the vertices of the white image projected by the Laplace operator, the Harris operator, or the like. The PC 5 can also detect the lamest area among the areas having pixel values equal to or higher than the predetermined pixel value in the captured image as the projection area. The PC 5 extracts an area where the projection area 21a in the captured image 41a and the projection area 22b in the captured image 41b overlap each other as a superimposed area of the images projected onto the projection areas 21a and 22b. The PC 5 acquires the pixel values in the superimposed areas 31a, 31b, and 31c in each of the captured images 41a, 41b, and 41c.

In the step S103, when there is no superimposed area, when the area of the superimposed area is smaller than a predetermined area (area threshold), or when the ratio of the area of the superimposed area 31c to the area of the captured image 41c (image area) is smaller than a predetermined ratio, the PC 5 sets a predetermined gamma characteristic (predetermined imaging characteristic) as a corrected gamma characteristic of the camera 4. The predetermined gamma characteristic may be selected by the user through the operation unit 108 while he refers to the displayed menu, or a single, previously prepared gamma characteristic may be used. The same applies where the ratio of the area of the superimposed area 31c to the total area of the projection areas 21c and 22c is smaller than a predetermined ratio.

Next, in the step S104, the PC 5 calculates a first representative pixel value from the pixel value of the superimposed area 31a of the captured image 41a. Next, in the step S105, the PC 5 calculates a second representative pixel value from the pixel value of the superimposed area 31b of the captured image 41b. Next, in the step S106, the PC 5 calculates a third representative pixel value from the pixel value of the superimposed area 31c of the captured image 41c. Each representative pixel value may be an average value or a median of a plurality of pixel values in the superimposed area (within a predetermined area), and may be one value calculated from the plurality of pixel values. A pixel value at a position (coordinate) designated in the superimposition area may be used as a representative pixel value. The designated position at this time can be selected as appropriate, such as the coordinate of the center of gravity of the superimposed area or the coordinate indicating the maximum pixel value in the superimposed area of the captured image obtained in the step S102, but it may be the corresponding position (the same position) in each of the three captured images 41a, 41b, and 41c. The representative pixel value may be calculated from pixel values at a plurality of positions specified in the superimposed area.

Next, in the step S107, the PC 5 calculates the gamma characteristic (gamma value) of the camera 4 using the first, second, and third representative pixel values calculated in the steps S104 to S106. Ideally, the following expression (1) is established for the luminance of the superimposed area.

$$x_3 = x_1 + x_2 \tag{1}$$

In the expression (1), $x_1$ represents a luminance value of light projected by the first projector 11, and $x_2$ represents a luminance value of light projected by the second projector 12. $x_3$ indicates a total luminance value of light projected by the first and second projectors 11 and 12. In the captured image generated by the camera 4 as well, if the gamma characteristic of the camera 4 is linear as illustrated in FIG. 1A, the expression (1) is established when $x_1$, $x_2$, and $x_3$ are set to pixel values of the captured image. However, if the gamma characteristic of the camera 4 is nonlinear, the expression (1) is not established.

The first, second, and third representative pixel values $y_1$, $y_2$, and $y_3$ of the captured images 41a, 41b, and 41c are made, as shown in the following expressions (2), by the luminance values $x_1$, $x_2$, and $x_3$ of the light (or the light amount received by the camera 4) projected by the first and second projectors 11 and 12 raised to the power corresponding to the gamma value of "a" of the camera 4.

$$y_1 = x_1^a$$

$$y_2 = x_2^a$$

$$y_3 = x_3^a \tag{2}$$

In the expressions (2), the known values are $y_1$, $y_2$, and $y_3$, and the unknown values are $x_1$, $x_2$, $x_3$, and a. The PC 5 obtains the gamma value of "a" using the following expression (3) in which $x_1$, $x_2$, and $x_3$ are deleted from the expressions (1) and (2).

$$y_3^{\frac{1}{a}} = y_1^{\frac{1}{a}} + y_2^{\frac{1}{a}} \tag{3}$$

For example, by solving the expression (3) using the Newton method with the initial value a=1.0, a numerical solution of "a" can be obtained.

Finally, in the step S108, the PC 5 corrects a pixel value Y of the captured image generated by the camera 4 using the gamma value "a" calculated in the step S107. More specifically, the corrected pixel value Y' is calculated using the following expression (4). Correcting the pixel value Y of the captured image in this way is equivalent with correcting the gamma characteristic (gamma value) of the camera 4.

$$Y' = Y^{\frac{1}{a}} \quad (4)$$

The PC 5 adjusts the gamma characteristics of the projectors 11 and 12 to a predetermined gamma value using the corrected pixel value Y'. More specifically, after projecting the test patterns of each gradation from the projectors 11 and 12 and calculating the current gamma characteristics of the projectors 11 and 12, it sets the characteristic of each of the projectors 11 and 12 to the predetermined gamma value (such as a gamma value of 2.2). Then, after the projectors 11 and 12 are set to the predetermined gamma value, the gradation (brightness) can be smoothly connected by adjusting the light amount in the area corresponding to the superimposed area. More specifically, the panel drive signal is corrected so as to increase or decrease the light amount (gradation) modulated in the modulation area corresponding to the superimposed area in the light modulation panel 102. This is equivalent to the linear correction of the gamma characteristic of the camera 4, and the luminances of the images 21 and 22 projected by the first and second projectors 11 and 12 illustrated in FIG. 4 can be smoothly connected to each other in the superimposed area 31.

If the gamma value "a" of the camera 4 is known, only the pixel value Y (or the gamma characteristic) of the captured image in the step S108 may be corrected.

This embodiment has described a single camera capturing images projected by the first and second projectors, but may use a plurality of cameras. This embodiment has described the first and second projectors projecting horizontally arranged images, but they may project vertically arranged images or one image may include the other image.

Second Embodiment

Figure 8:
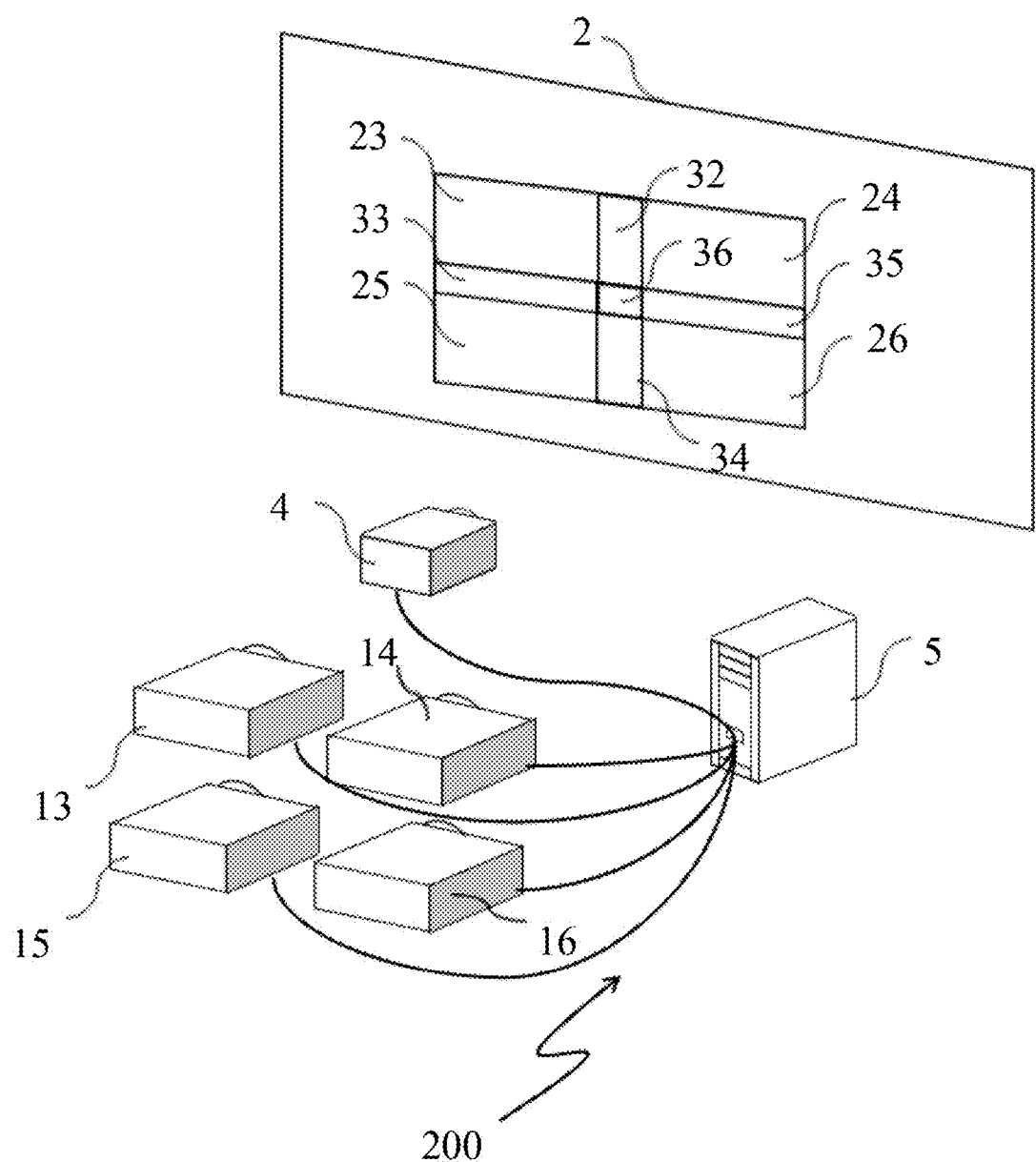
FIG. 8 illustrates an image projection system including a projection control apparatus according to a second embodiment of the present invention.

FIG. 8 illustrates an image projection system 200 including the PC 5 as the projection control apparatus according to a second embodiment of the present invention. The system 200 displays one large screen image by connecting four images 23, 24, 25, and 26 projected onto the projection surface 2 by four projectors 13, 14, 15, and 16, respectively. The four images 23 to 26 are arranged two in the horizontal direction and two in the vertical direction. Edge blending is made so that these images 23 to 26 are superimposed on each other in superimposed areas 32, 33, 34, and 35, which are predetermined areas near the edges of the four images 23 to 26.

The four images 23 to 26 are captured by the camera 4, and the PC 5 performs correction processing for the luminances of the images projected by the four projectors 13 to 16 using the captured images obtained from the camera 4. The PC 5 corrects the gamma characteristic (imaging characteristic) of the camera 4 using the captured image.

Figure 9:
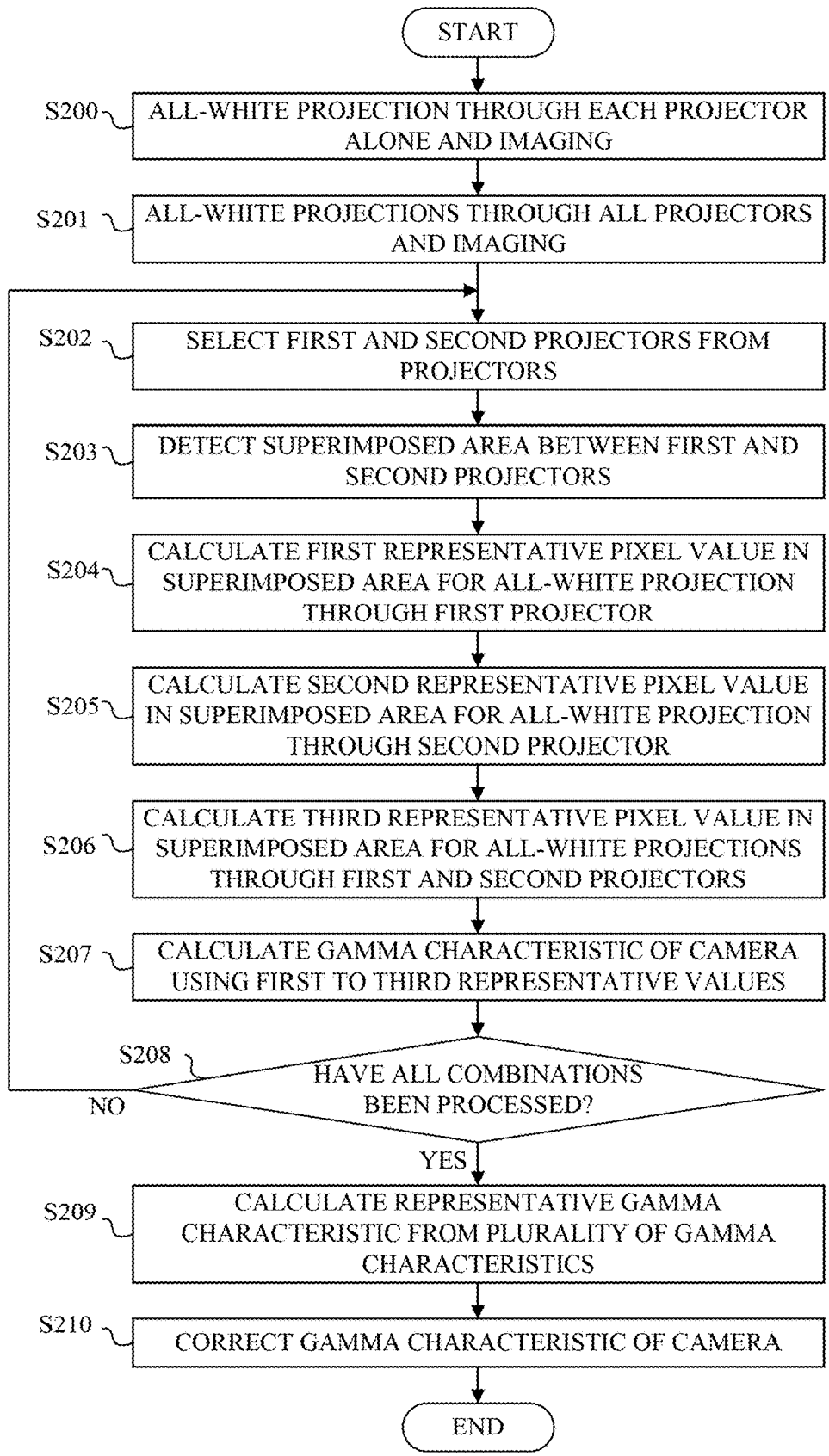
FIG. 9 is a flowchart illustrating gamma correction processing according to the second embodiment.

A flowchart in FIG. 9 shows the correction processing of the gamma characteristic of the camera 4 performed by the PC 5. The PC 5 starts the correction processing under the same condition as that described with reference to FIG. 6 in the first embodiment. In the step S200, the PC 5 causes each of the four projectors 13 to 16 to sequentially and individually project an all-white image onto the projection surface 2. Three projectors other than one projector that projects the all-white image are caused to project all-black images. The all-white image and the all-black image arranged in the horizontal and vertical directions have superimposed areas that overlaps each other.

The PC 5 causes the camera 4 to capture the all-white image and the all-black image each time when each projector projects the all-white image. Instead of causing the three projectors to project the all-black images, the light source may be turned off, or the shutter may block the illumination light from entering the light modulation panel.

Next, in the step S201 the PC 5 causes all the projectors 13 to 16 to simultaneously project the all-white images on the projection surface 2. The four all-white images have superimposed areas that overlap each other. Then, the PC 5 causes the camera to capture these all-white images.

Next, in the step S202, the PC 5 selects the first projector and the second projector from among all the projectors 13 to 16. For example, the projectors 13 and 14 are selected as the first and second projectors, and the projectors 15 and 16 are selected as the first and second projectors. The first and second projectors may be automatically selected by the PC 5. The all-white images projected by the first and second projectors in the step S200 correspond to the first image and the second image. When the flow returns to the step S202 from the step S208 to be described later, the PC 5 selects a different set from the previous set of the first and second projectors. Thereby, a plurality of sets of first and second projectors are selected from the four projectors 13 to 16.

Next, in the step S203, the PC 5 determines the superimposed area in the images projected by the first and second projectors selected in the step S202 from the five captured images captured by the camera 4 in the steps S200 and S201.

FIG. 10A illustrates a captured image 42a captured by the camera 4 when the all-white image is projected onto the projection area 23a on the projection surface 2 by the projector 13 in the step S200. FIG. 10B illustrates a captured image 42b captured by the camera 4 when the all-white image is projected onto the projection area 24b on the projection surface 2 by the projector 14 in the same step. FIG. 10C illustrates a captured image 42c captured by the camera 4 when the all-white image is projected onto the projection area 25c on the projection surface 2 by the projector 15 in the same step. FIG. 10D illustrates a captured image 42d captured by the camera 4 when the all-white image is projected onto the projection area 26d on the projection surface 2 by the projector 16 in the same step. FIG. 10E illustrates a captured image 42e captured by the camera 4 when the all-white images are projected onto the projection areas 23e, 24e, 25e, and 26e on the projection surface 2 by the four projectors 13 to 16 in the step S201.

In these figures, superimposed areas 32a, 33a, 32b, 35b, 33c, 34c, 34d, 35d, 32e, 33e, 34e, and 35e are shaded that are superimposed areas between only two of the projection areas 23a, 24b, 25c, 26d (23e, 24e, 25e, 26e) or images projected on the two projection areas. For example, when the projectors 13 and 14 are selected as the first and second projectors, the PC 5 extracts the superimposed area between the projection areas 23a and 24b from the captured images 42a, 42b and 42e as the superimposed areas 32a, 32b, and 32e of the images projected onto the projection areas 23a and 24b. The method of detecting the projection area and the processing when there is no superimposed area and when the area of the superimposed area is smaller than the area threshold as the predetermined value are the same as those described in the step S103.

This step can correct the camera 4 by extracting the superimposed areas of the images projected by three or more projectors, but this embodiment extracts the superimposed area of the images the projected by two projectors for simple description. Even when the superimposed areas of the images projected by three or more projectors are extracted, one of them may be assigned to the first projector, and all other projectors may be assigned to the second projectors.

The following description continues by assuming that the projectors 13 and 14 are selected as the first and second projectors, but the same applies to a combination of other projectors if it is selected.

Next, in the step S204, the PC 5 calculates a first representative pixel value from the pixel value of the superimposed area 32a of the captured image 42a. Next, in the step S205, the PC 5 calculates a second representative pixel value from the pixel value of the superimposition area 32b of the captured image 42b. In the step S206, the PC 5 calculates a third representative pixel value from the pixel value of the superimposition area 32e of the captured image 42e. The method of calculating the first to third representative pixel values is as described in the step S104 in the first embodiment.

Next, in the step S207, the PC 5 calculates the gamma characteristic (gamma value) of the camera 4 using the first, second, and third representative pixel values calculated in the steps S204 to S206. The method of calculating the gamma value is as described in the step S107 in the first embodiment.

Next, in the step S208, the PC 5 determines whether or not all the processes from the step S202 to the step S207 for the combination of the four projectors as the first and second projectors have been completed. If there is a combination for which processing has not been completed, the flow returns to the step S202. If all combinations have been completely processed, the flow proceeds to the step S209. The number of combinations when there are four projectors is $_4C_2=6$.

In the step S209, the PC 5 calculates a representative gamma value from the gamma values obtained for each combination of projectors in the step S207. As the representative gamma value, a weighted average value obtained by weight-averaging the gamma values with the area of the superimposed area, or a gamma value obtained by a combination that maximizes the area of the superimposed area may be used. An average value or a median of gamma values obtained for each combination of projectors may be used as a representative gamma value. A gamma value that minimizes the error of the first, second, and third representative pixel values obtained in all combinations may be used as the representative gamma value. Then, the step of temporarily storing the first, second and third representative pixel values obtained in the steps S204 to S206 in a memory (not shown) is provided. Various methods, such as a least squares method, can be used as a method for calculating the representative gamma value that minimizes the error.

Finally, in the step S210, the PC 5 corrects the pixel value Y of the captured image generated by the camera 4 similar to the step S108 of the first embodiment, using the representative gamma value "a" calculated in the step S209. That is, the gamma characteristic (gamma value) of the camera 4 is corrected.

The PC 5 adjusts the gamma characteristics of the four projectors 13 to 16 to a predetermined gamma value using the corrected pixel value Y'. More specifically, after projecting the test patterns of each gradation from the projectors 13 to 16 and calculating the current gamma characteristics of the projectors 13 to 16, the PC 5 sets the characteristics to the predetermined gamma value (such as the gamma value of 2.2). The PC 5 corrects the luminance of the image light projected onto the corresponding superimposed area. This is equivalent to the linear correction of the gamma characteristic of the camera 4, and the luminances of the images 23 to 26 projected by the projectors 13 to 16 illustrated in FIG. 8 can be smoothly connected to each other in each superimposed area.

This embodiment has described a single camera capturing images projected by four projectors, but may use a plurality of cameras. This embodiment has described four projection images arranged in a matrix shape. However, the same correction processing as that of this embodiment is applicable to various projection forms such as horizontally or vertically arranged projection images and the projection image included in another projection image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The above embodiments can smoothly connect the luminances of the projection images in the multi-projection in their superimposed areas.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-031907, filed on Feb. 25, 2019, which is hereby incorporated by reference herein in its entirety.

What is claimed is:

1. A projection control apparatus configured to control a first image projection apparatus that projects a first image and a second image projection apparatus that projects a second image so that the first image and the second image are superimposed on each other in a predetermined area, the projection control apparatus comprising:

a corrector configured to correct an imaging characteristic for converting a received light amount into captured image data in an imaging apparatus that captured the first and second images, using a pixel value of the predetermined area in the captured image data obtained from the imaging apparatus; and a controller configured to control at least one of the first or second image projection apparatus using the corrected imaging characteristic, wherein the corrector:

acquires a first representative pixel value that is the pixel value of the predetermined area from first captured image data obtained from the imaging apparatus that has captured the first image projected alone;

acquires a second representative pixel value that is the pixel value of the predetermined area from second captured image data obtained from the imaging apparatus that has captured the second image projected alone;

acquires a third representative pixel value that is the pixel value of the predetermined area from third captured image data obtained from the imaging apparatus that has captured the first and second images superimposed on each other in the predetermined area; and corrects the imaging characteristic using the first, second, and third representative pixel values.

2. The projection control apparatus according to claim 1, wherein the corrector corrects the imaging characteristic so that the light receiving amount is linearly converted into a pixel value of the captured image data.

3. The projection control apparatus according to claim 1, wherein the corrector determines, as the first, second, and third representative pixel values, an average value or a median of a plurality of pixel values in the predetermined area in the first, second, and third captured image data.

4. The projection control apparatus according to claim 1, wherein the corrector acquires the first, second, and third representative pixel values using pixel values at one or more positions in the predetermined area in the first, second, and third captured image data.

5. The projection control apparatus according to claim 1, wherein the corrector sets the corrected imaging characteristic to a predetermined characteristic when the predetermined area is smaller than a predetermined size:

when a first ratio of the predetermined area to an image area of the captured image data is smaller than a first predetermined ratio, or when a second ratio of the predetermined area to a total area of the projection areas onto which the first and second images are projected is smaller than a second predetermined ratio.

6. The projection control apparatus according to claim 1, wherein the corrector selects a plurality of sets of the first and second image projection apparatuses from three or more image projection apparatuses, and corrects the imaging characteristic using the pixel value of the predetermined area in the captured image data obtained from the imaging apparatus for each of the plurality of sets.

7. An image projection apparatus comprising:

a light modulation element configured to modulate light from a light source, and to project light modulated by the light modulation element to display an image;

a projection control apparatus configured to control a first image projection apparatus that projects a first image and a second image projection apparatus that projects a second image so that the first image and the second image are superimposed on each other in a predetermined area, wherein the projection control apparatus includes:

a corrector configured to correct an imaging characteristic for converting a received light amount into captured image data in an imaging apparatus that captured the first and second images, using a pixel value of the predetermined area in the captured image data obtained from the imaging apparatus; and a controller configured to control at least one of the first or second image projection apparatus using the corrected imaging characteristic, wherein the corrector:

acquires a first representative pixel value that is the pixel value of the predetermined area from first captured image data obtained from the imaging apparatus that has captured the first image projected alone;

acquires a second representative pixel value that is the pixel value of the predetermined area from second captured image data obtained from the imaging apparatus that has captured the second image projected alone;

acquires a third representative pixel value that is the pixel value of the predetermined area from third captured image data obtained from the imaging apparatus that has captured the first and second images superimposed on each other in the predetermined area; and corrects the imaging characteristic using the first, second, and third representative pixel values.

8. A projection control method configured to control a first image projection apparatus that projects a first image and a second image projection apparatus that projects a second image so that the first image and the second image are superimposed on each other in a predetermined area, the projection control method comprising the steps of:

correcting an imaging characteristic for converting a received light amount into captured image data in an imaging apparatus that captured the first and second images, using a pixel value of the predetermined area in the captured image data obtained from the imaging apparatus; and controlling at least one of the first or second image projection apparatus using the corrected imaging characteristic, wherein the correcting step:

acquires a first representative pixel value that is the pixel value of the predetermined area from first captured image data obtained from the imaging apparatus that has captured the first image projected alone;

acquires a second representative pixel value that is the pixel value of the predetermined area from second captured image data obtained from the imaging apparatus that has captured the second image projected alone;

acquires a third representative pixel value that is the pixel value of the predetermined area from third captured image data obtained from the imaging apparatus that has captured the first and second images superimposed on each other in the predetermined area; and corrects the imaging characteristic using the first, second, and third representative pixel values.

9. A non-transitory computer-readable storage medium storing a computer program executable by a computer in an imaging apparatus to execute a projection control method configured to control a first image projection apparatus that projects a first image and a second image projection apparatus that projects a second image so that the first image and the second image are superposed on each other in a predetermined area, wherein the projection control method includes comprising the steps of:

correcting an imaging characteristic for converting a received light amount into captured image data in the imaging apparatus that captured the first and second images, using a pixel value of the predetermined area in the captured image data obtained from the imaging apparatus; and controlling at least one of the first or second image projection apparatus using the corrected imaging characteristic, wherein the correcting step:

acquires a first representative pixel value that is the pixel value of the predetermined area from first captured image data obtained from the imaging apparatus that has captured the first image projected alone;

acquires a second representative pixel value that is the pixel value of the predetermined area from second captured image data obtained from the imaging apparatus that has captured the second image projected alone;

acquires a third representative pixel value that is the pixel value of the predetermined area from third captured image data obtained from the imaging apparatus that has captured the first and second images superimposed on each other in the predetermined area; and corrects the imaging characteristic using the first, second, and third representative pixel values.

* * * * *